Nov. 18, 1958
J. NAJJAR
2,860,596
AUTOMOTIVE TRANSMISSION RANGE SELECTOR
Filed May 1, 1957
3 Sheets-Sheet 1
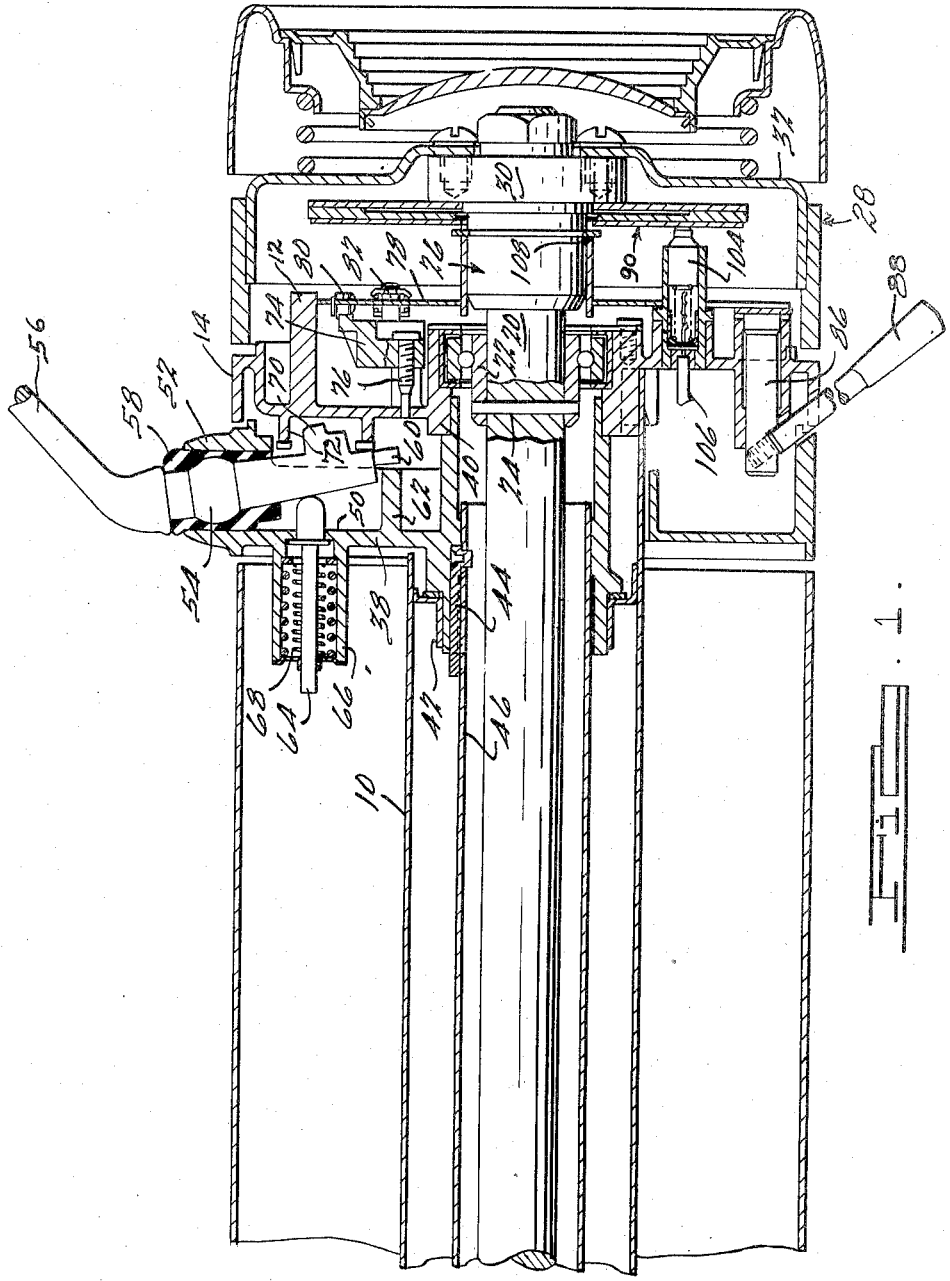
INVENTOR.
JOHN NAJJAR
BY Edwin C. McAee
John R. Faulkner
& Donald J. Harrington
ATTORNEYS

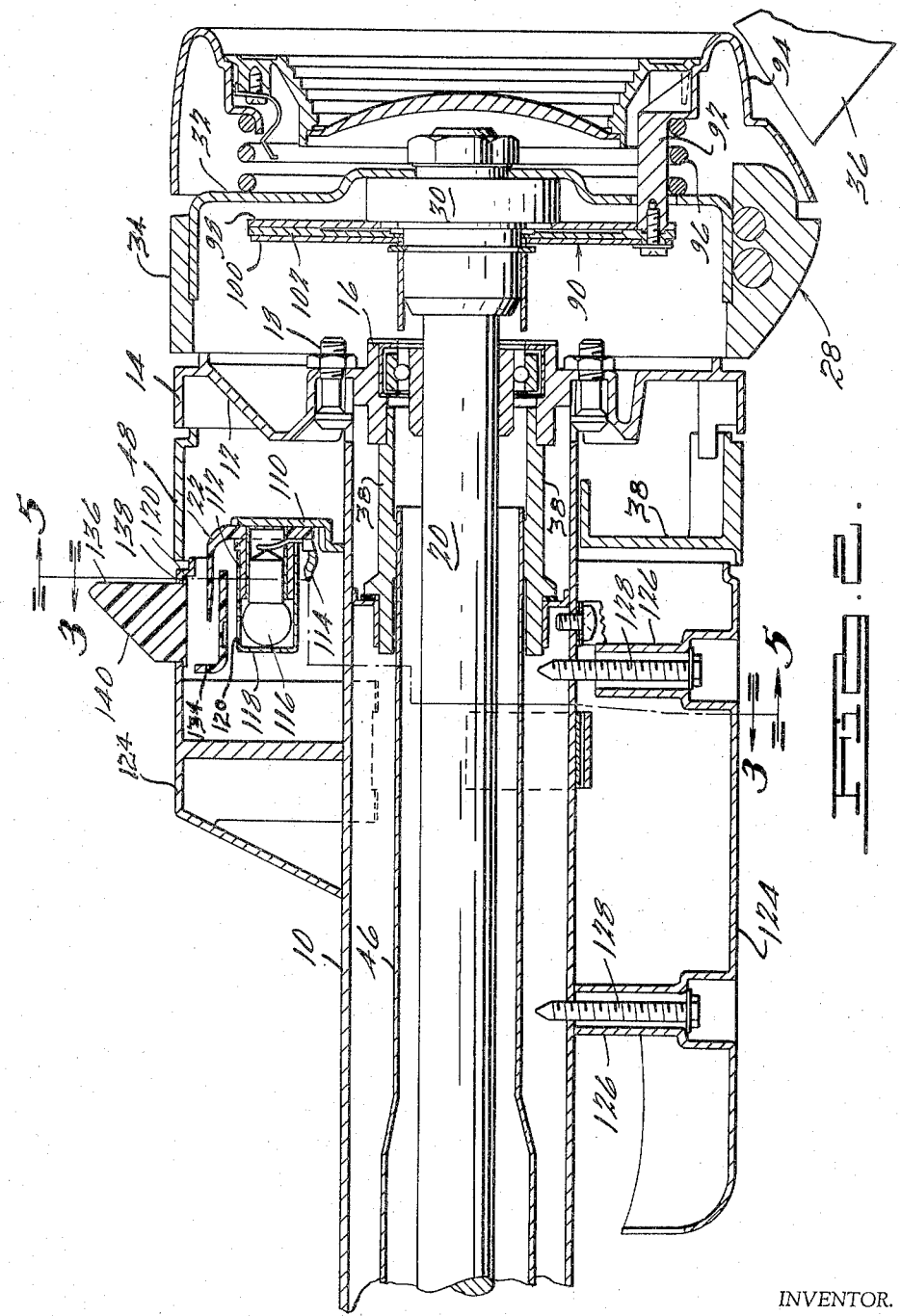

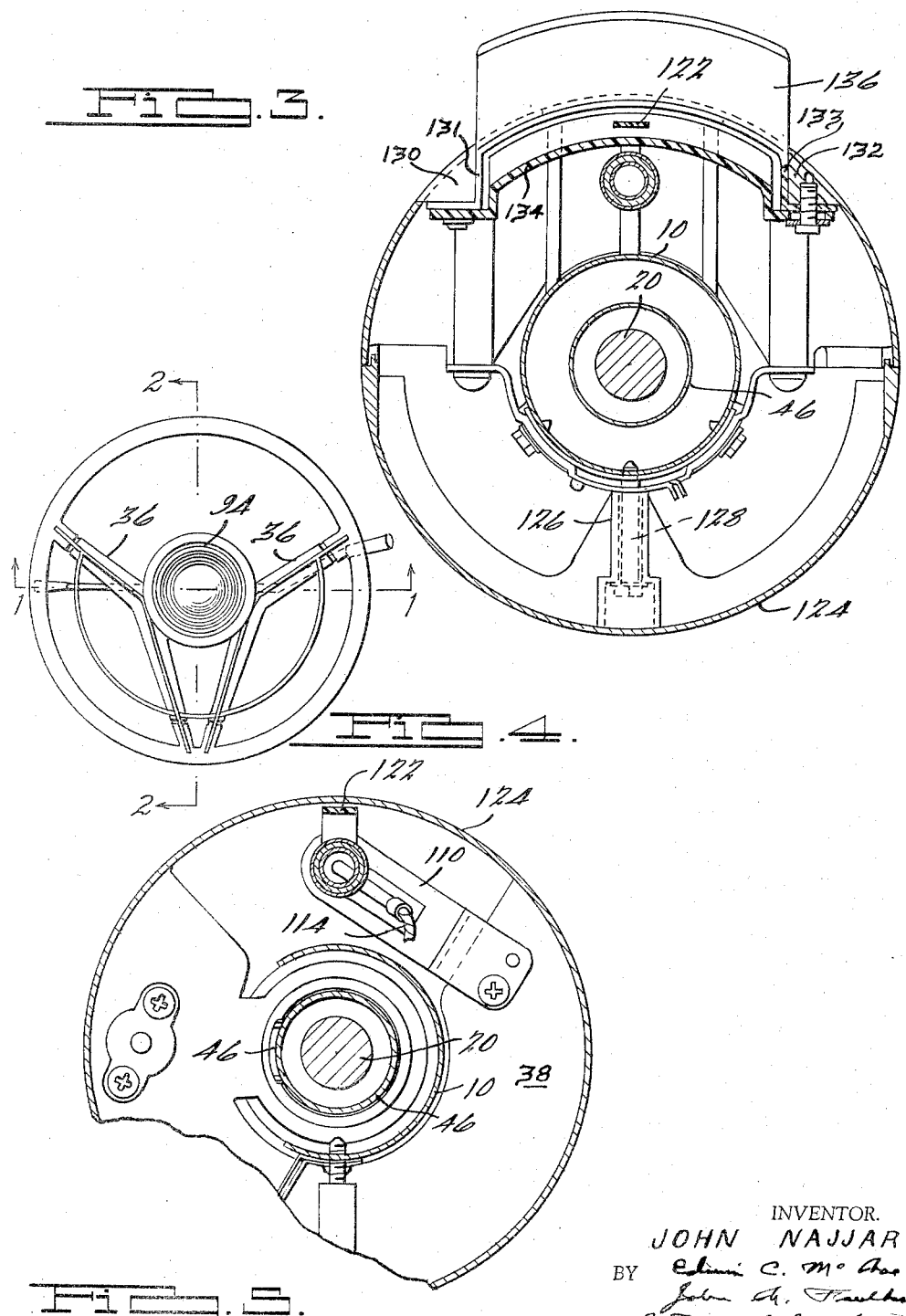

United States Patent Office 2,860,596
Patented Nov. 18, 1958

2,860,596

AUTOMOTIVE TRANSMISSION RANGE SELECTOR

John Najjar, Farmington, Mich., assignor to Ford Motor Company, Dearborn, Mich., a corporation of Delaware Application May 1, 1957, Serial No. 656,302

10 Claims. (Cl. 116—124)

My invention relates to power transmission mechanisms and more particularly to automatic, multiple speed, power transmission mechanisms of the automotive type.

Automatic power transmission mechanisms commonly used in the automotive field are usually characterized by a plurality of drive ranges which may be manually selected by the vehicle operator. In many cases a control lever is situated near the vehicle steering wheel for this purpose and a mechanical connection is made between the control lever and the control elements of the transmission for actuating the latter.

The improvement of my instant invention comprises a new and improved range selector mechanism which includes a visual indicator for designating the operating range which the transmission is caused to assume.

The provision of an improved range selector mechanism of the type above mentioned being a principal object of my invention, it is a further object of my invention to provide a transmission range selector having a manually operable selector lever with several operative positions, each position being designated by an appropriate symbol of an illuminated indicator dial.

It is a further object of my invention to provide a range selector mechanism as set forth in the preceding objects wherein a visual means is employed for producing an image of the symbols designating the various operating ranges and for transferring the same into the line of vision of the vehicle operator thereby providing a higher degree of convenience and safety.

It is a further object of my invention to provide a range selector mechanism as set forth in the preceding object wherein the visual means includes a luminous, light reflecting element located on the steering column in the region of said luminous dial.

It is a further object of my invention to provide a range selector mechanism as set forth above which is of simplified construction and which may be adapted to be used with a large variety of steering wheel column assemblies.

For the purpose of more particularly setting forth one operative embodiment of my invention reference will be made to the accompanying drawings wherein:

Figure 1 is a longitudinal cross sectional view of the upper portion of a steering wheel column assembly for an automotive vehicle and is taken along section line 1—1 of Figure 4;

Figure 2 is a longitudinal cross sectional view of the steering column of Figure 1 and is taken along section line 2—2 of Figure 4;

Figure 3 is a transverse cross sectional view of the steering column of Figures 1 and 2 and taken along section line 3—3 of Figure 2;

Figure 4 is a view showing on a reduced scale the top side of the steering wheel as viewed in the direction of the axis of the steering column; and Figure 5 is a transverse sectional view taken along section 5—5 of Figure 2.

Referring first to Figures 1 and 2, numeral 10 designates a fixed sleeve which is secured by suitable bracket means to the vehicle dash structure and to the forward portion of the chassis in a conventional manner. To provide a support for the steering wheel column assembly and the vehicle steering wheel, the upper end of the column 10 has secured thereto a circular support member 12 having a cylindrical outer portion 14 and a radially inward bearing support portion 16. Suitable fastening bolts 18 are provided for securing the member 12 to the upper end of the sleeve 10 as indicated.

A steering shaft 20 extends coaxially with respect to sleeve 10 and is rotatably journaled by a suitable bearing 22 received within the bearing support portion 16 of the member 12. A pin 24 or some other suitable means may be provided as shown for preventing rotation between the shaft 20 and the inner race of the bearing 22. The upper end of the shaft 20 carries a hub 26 of a steering wheel designated in part in Figure 2 by numeral 28. The steering wheel hub comprises a flanged portion 30 positively connected to the end of the shaft 20 and a disc portion 32 bolted to flanged portion 30. The disc 32 includes a peripheral drum 34 having a diameter substantially equal to the diameter of the aforementioned drum portion 14.

As best seen in Figure 2, the drum 34 forms an inner ring through which the radially inward ends of the steering wheel spokes 36 may be secured. It will thus be apparent that if the steering wheel 28 is revolved about its axis, the steering shaft 20 will rotate therewith within the bearing 22. The other end of the steering shaft 20 may be secured to the vehicle steering linkage and rotatably journaled at its lowermost end in a conventional manner.

Referring to Figure 1, the steering column assembly further includes a substantially circular cast portion 38 which may be suitably supported on the stationary member 12 as indicated at 40. The cast portion 38 is also rotatably supported by a stationary sleeve 10 as indicated at 42, a suitable collar being provided for this purpose. The cast portion 38 is positively keyed or otherwise secured at 44 to a shift tube 46 which may be adapted to be rotatably adjusted about the axis of the stationary sleeve 10 and the steering shaft 20. The lower end of the shift tube 46 is mechanically coupled to the gear shift elements of the transmission mechanism in a conventional manner.

The casting 38 includes a peripheral drum portion 48 having a diameter substantially equal to the diameter of the aforementioned drum portion 14 of the stationary member 12. The cast portion 38 further embodies a substantially radial recess 50 formed in a radial portion 52 which is adapted to receive the finger 54 formed on the end of a gear shift lever 56 extending in a transverse direction with respect to the axis of the steering shaft 20. The outer end of the lever 56 is disposed adjacent the rim of the steering wheel 28 where it may be conveniently manipulated by the vehicle operator during operation. A suitable resilient grommet 58 is positioned about the finger 52 to provide a resilient connection between the lever 56 and the cast portion 38.

The end of the finger 54 is formed with an extension 60 which is adapted to engage an extension 62 integrally formed on the cast portion 38 when the lever is oscillated in a clockwise direction as viewed in Figure 1. As the lever is then rotated about the axis of the steering column assembly, the cast portion 38 is caused to rotate within its centrally positioned bearing thereby causing the shift tube 46 to rotate to any of the several shift positions. The finger 54 of the lever 56 is normally urged in a counterclockwise direction as viewed in Figure 1 by a spring loaded plunger 64 which is positioned within a suitable enclosure 66 formed on the cast portion 38.

The plunger 64 is urged in a right hand direction as viewed in Figure 1 by a spring 68.

The finger 54 is formed with a key 70 which is adapted to be received within a gate opening 72. The gate opening 72 includes a variety of sections within which the key 70 may be received. It is thus apparent that when the key 70 is situated within any one of the sections, the lever 56 is restrained from movement about the axis of the column assembly. In order to shift a lever from one operating position to another, it is necessary to lift the same thereby withdrawing the key 70 from the associated gate opening 72 against the tension applied by the spring loaded plunger 64.

Figure 1 further shows a turn signal indicator switch 74 secured to the stationary member 12 by suitable screws 76. The switch 74 forms a portion of the turn signal mechanism, said mechanism further comprising a plate member 78 which carries a spring loaded detent wheel 80 adapted to be received within mating detent recesses formed in the outer casing of the switch 74. A movable anchor element is positioned at a radially inward location as shown at 82 and is adapted to be moved in a tangential direction about the axis of the column assembly by the plate member 78. A spring is situated between the element 82 and the plate member 78 for normally urging the latter toward the switch 74 thus causing the detent wheel 80 to be urged into engagement with any one of the several detent recesses above mentioned.

The plate member 78 is adapted to be oscillated about the axis of a pin 86 which is secured to the plate member 78 as indicated, said pin being rotatably journaled in the stationary member 12 as shown in Figure 1. A suitable lever 88 is threadably connected to the pin 86 for the purpose of oscillating the latter, said lever 88 being situated at a convenient location below the steering wheel for convenient access by the vehicle operator.

The steering column assembly further includes a horn button mechanism comprising a multiple element disc support 90 for supporting a stud 92 which in turn forms a support for the horn button 94 located at the hub of the steering wheel 28. The horn button and the associated structure is normally urged in an outward axial direction by a compression spring 96 situated between the base of the stud 92 and the disc 32 of the steering wheel hub. The support 90 comprises a first disc member 98 secured to the flanged portion 30 of the steering wheel hub and a metallic disc member 100, the member 98 and the member 100 being separated by a suitable disc 102. The disc member 100 is contacted by a spring loaded contact element 104 which may be slidably positioned within the fixed member 12 as indicated in Figure 1. The plunger 104 has secured thereto an electrical lead 106 which extends to one terminal of the vehicle battery. It is thus apparent that a continuous electrical connection between the disc member 100 and the battery is effected regardless of the position of the steering wheel. The disc member 100 is grounded through the steering wheel shaft 20 when the disc member 100 contacts a snap ring 108 as the horn button mechanism is pressed thereby completing the horn circuit.

As best seen in Figures 2 and 5 the cast structure 38 has secured thereto a bracket 110 which in turn carries an electric lamp socket 112, a suitable electric lead 114 extending to the base of the socket. An electric lamp 116 may be situated in the socket as shown in electrical contact with the lead 114, a portion of the socket 112 being grounded through the supporting cast structure 38. The lamp 116 is surrounded by a masking means such as a cylindrical case 118 having an aperture 120 located therein for allowing a beam of light to pass therethrough in a vertically upward direction as viewed in Figure 2. An indicator element in the form of a pointer 122 is secured to the cast portion 38 adjacent the socket 112 and it extends axially as indicated into the region of the beam of light produced by the lamp 116.

An outer shroud or casing 124 encircles the upper end of the steering column assemblage and the outer diameter thereof is substantially equal to the diameter of the adjacent drum portion 48 of the casting 38. The casing 124 is supported by and secured to the stationary sleeve 10 by means of spacers 126 and cooperating bolts 128.

Referring next to Figure 3 the upper side of the casing 124 is formed with shoulders 130 and 132 to which the ends of an arcuate dial 134 may be secured. The dial 134 is positioned in the path of the light produced by the lamp 116 and is situated between the lamp shroud 118 and the pointer 122. Suitable symbols may be inscribed on the dial 134.

A light conductive element 136 in the form of a transparent or translucent prism 136 is supported on the upper side of the casing 124 as indicated in Figures 2 and 4 and is positioned within a mating aperture on the upper side of the casing 124 as indicated. The prism 136 is arcuate in shape to conform to the outer periphery of the casing 124 and is held in place within the associated aperture by suitable extensions 131 and 133, the latter being secured to shoulders 130 and 132 respectively. The prism 136 includes a light reflecting oblique surface 140 which is adapted to bend the beam of light produced by the lamp 116 in a direction substantially parallel to the axis of the column assembly. The prism is arranged so that the beam of light will be in the line of vision of the vehicle operator.

The light conductive dial 134 may be formed of translucent or transparent material to permit the beam of light to pass therethrough and the symbols engraved thereon may be made opaque so that an image of the symbol will be transferred to the prism 136 and reflected thereby into the line of vision of the operator. By preference, the pointer 122 is formed of translucent material although an opaque material may also serve for this purpose.

It will be apparent from the foregoing description that the lamp 116 and the pointer 122 will be rotated about the axis of the column assembly when the gear shift lever 56 is operated from one position to another. The dial 134 remains stationary since it is secured to the stationary casing 124. It is thus seen that each of the symbols on the dial 134 is made to correspond to each of the separate gear shift lever positions which are provided. Each of the various positions represented by the individual symbols may be visually observed by the vehicle operator by referring to the image produced by the lamp and prism arrangement. If desired, the various symbols may be made of different colors.

The principles of my invention may be readily adapted to be used with many types of steering column assemblies, and in addition to its functional values, my visual indicator enhances the aesthetic effect created by the interior styling of the vehicle.

What I claim and desire to secure by United States Letters Patents is:

1. In an automotive vehicle having a steering column, a manually operable transmission shift lever mounted on said steering column, an electric lamp located within said column in the vicinity of said lever, and adapted to produce a transverse beam of light, a light reflecting prism mounted on said column adjacent said light and adapted to direct said beam of light from said lamp in a direction substantially parallel to the principal axis of said column, and an indicator element carried by said lever within said beam of light to designate the position of the shift lever.

2. In an automotive vehicle having a steering column, a manually operable transmission shift lever, means for adjustably mounting said shift lever on said column, an electric lamp carried by said lever mounting means within said column, a light reflecting element mounted on said column adjacent said lamp and radially outward therefrom with respect to the axis of said steering column, said element having an oblique, light reflecting surface, a light conductive dial located between said lamp and said element and spaced symbols located on said dial, said element being adapted to produce an image of said symbols and to cast the same into the line of vision of the vehicle operator.

3. In an automotive vehicle having a steering column including a stationary supporting shaft and a rotatable steering shaft; a manually operable transmission shift lever, means for rotatably mounting said shift lever on said stationary shaft, a shroud mounted on the upper portion of said steering column including a stationary portion supported by said stationary shaft, an electric lamp enclosed by said shroud, an opening in said shroud adjacent said lamp and radially outward therefrom with respect to the axis of said steering column, a light reflecting prism situated in said opening, an indicator dial located in said shroud adjacent said prism, and means for masking said lamp to produce a substantially radially directed beam of light to illuminate said dial and said prism being adapted to create an image of said dial and to align the same with the line of vision of the vehicle operator the latter extending substantially parallel to the axis of said steering column.

4. In an automotive vehicle having a steering column, a manually operable transmission shift lever, means for adjustably mounting said shift lever on said column, an electric lamp located within said column, a light conductive prism mounted on said column adjacent said lamp, said prism having an oblique, light reflecting surface, a light conductive dial located in the vicinity of said lamp, said dial having symbols thereon corresponding to each of the operating positions of said lever, an indicator element carried by said lever mounting means and movable with said lever relative to said dial, said prism being located radially outward from said lamp and adapted to produce an image of said symbols and said indicator and to align the same with the line of vision of the vehicle operator, the latter extending substantially parallel to the axis of said steering column.

5. In an automotive vehicle having a steering column, a manually operable transmission shift lever, means for adjustably mounting said shift lever on said column, an electric lamp located within said column, a light reflecting prism mounted on said column radially adjacent said lamp, said prism having an oblique, light reflecting surface, a light conductive dial located in the vicinity of said lamp, means for masking said lamp to produce a beam of light arranged to pass through said dial in a transverse direction relative to the axis of said column, said dial having symbols thereon corresponding to each of the operating positions of said lever, an indicator element located adjacent said dial, said lamp and said indicator element being carried by said lever mounting means and adapted to move across said dial as said lever is rotated to any of several operating positions, said prism being adapted to produce an image of said symbols and to align the same with the line of vision of the vehicle operator.

6. The combination as set forth in claim 5 wherein said prism is arcuate in shape to conform to the contour of said column and is located at the top side of said column and at the upper end thereof.

7. In an automotive vehicle having a steering column including a stationary supporting shaft and a rotatable steering shaft; a manually operable shift lever, means for rotatably mounting said shift lever on said stationary shaft, a shroud mounted on the upper end of said steering column including a stationary portion supported by said stationary shaft, an electric lamp enclosed by said shroud, an opening in said shroud adjacent said lamp, a light reflecting prism situated in said opening, an indicator dial located in said shroud adjacent said prism, an indicator element situated adjacent said dial, said indicator element being carried by said lever mounting means, said lamp being adapted to illuminate said dial and said prism being adapted to create an image of said dial and to align the same with the line of vision of the vehicle operator.

8. The combination as set forth in claim 7 wherein said lamp and said indicator element are each carried by said lever mounting means and are adapted to move therewith in unison relative to said dial as said shift lever is moved from one operating position to another.

9. In an automotive vehicle having a steering column, a manually operable transmission shift lever, means for adjustably mounting said shift lever on said column, a lamp located within said column and adapted to direct a beam of light in a direction transverse to the axis of said column, a light reflecting prism mounted on said column adjacent said lamp, said prism having an oblique, light reflecting surface, a position indicator dial element located adjacent said lamp, a pointer element located in said shroud adjacent said dial element, at least one of said elements being carried by said lever mounting means and movable relative to another of said elements during movement of said shift lever from one operating position to another, said lamp being adapted to illuminate said dial element and said prism being adapted to reflect the beam of light in a direction substantially parallel to the axis of said column and to create an image of said dial and align the same with the line of vision of the vehicle operator.

10. The combination as set forth in claim 9 wherein said one element is an indicator pointer adapted to move across the face of said dial element.

References Cited in the file of this patent
UNITED STATES PATENTS

| | | |
|---|---|---|
| 2,671,425 | Schneider | Mar. 9, 1954 |
| 2,672,116 | Gunderson | Mar. 16, 1954 |
| 2,672,117 | Morphew | Mar. 16, 1954 |
| 2,738,755 | Doane | Mar. 20, 1956 |